United States Patent
Erickson et al.

(10) Patent No.: US 10,862,866 B2
(45) Date of Patent: Dec. 8, 2020

(54) METHODS, SYSTEMS, AND COMPUTER READABLE MEDIA FOR MULTIPLE TRANSACTION CAPABILITIES APPLICATION PART (TCAP) OPERATION CODE (OPCODE) SCREENING

(71) Applicant: Oracle International Corporation, Redwood Shores, CA (US)

(72) Inventors: Mark Allen Erickson, Durham, NC (US); Vikram Mehta, Greensboro, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 196 days.

(21) Appl. No.: 16/019,454

(22) Filed: Jun. 26, 2018

(65) Prior Publication Data
US 2019/0394167 A1   Dec. 26, 2019

(51) Int. Cl.
*H04L 29/06* (2006.01)
*H04W 12/00* (2009.01)

(52) U.S. Cl.
CPC ...... *H04L 63/0245* (2013.01); *H04L 63/0263* (2013.01); *H04L 63/1441* (2013.01); *H04L 63/20* (2013.01); *H04W 12/00* (2013.01)

(58) Field of Classification Search
CPC ............. H04L 63/0245; H04L 63/0263; H04L 63/168; H04L 63/14; H04L 63/1441;
(Continued)

(56) References Cited

U.S. PATENT DOCUMENTS 5,701,301 A   12/1997   Weisser, Jr.
5,862,334 A   1/1999    Schwartz et al.
(Continued)

FOREIGN PATENT DOCUMENTS

WO   WO 01/19010 A1    3/2001
WO   WO 03/094458 A1   11/2003

OTHER PUBLICATIONS

Kacer et al., "SS7 Attacker Heaven turns into Riot: How to make Nation-State and Intelligence Attackers' lives much harder on mobile networks," P1 Security, pp. 1-85 (2017).
(Continued)

*Primary Examiner* — Kristine L Kincaid
*Assistant Examiner* — Shaqueal D Wade
(74) *Attorney, Agent, or Firm* — Jenkins, Wilson, Taylor & Hunt, P.A.

(57) ABSTRACT

A method for multiple transaction capabilities application part (TCAP) operation code (opcode) screening includes receiving a first SS7 signaling message including multiple TCAP opcodes. The method further includes determining that the first SS7 signaling message requires further processing. The method further includes, in response to determining that the first SS7 signaling message requires further processing, decoding, from the first SS7 signaling message, N TCAP opcodes, where N is an integer of at least two. The method further includes, for each of the N TCAP opcodes, applying a filter and determining that one of the filters indicates that the opcode, alone or in combination with other parameters in the first SS7 signaling message, is not allowed. The method further includes, in response to determining that the one filter indicates that the opcode, alone or in combination with the other parameters is not allowed, performing an SS7 firewall action.

18 Claims, 7 Drawing Sheets

(58) Field of Classification Search
CPC .................. H04L 63/20; H04L 63/02; H04L 29/06557–06625; G06F 21/50–577
See application file for complete search history.

(56) References Cited

U.S. PATENT DOCUMENTS

| | | | |
|---|---|---|---|
| 6,167,129 | A | 12/2000 | Fikis et al. |
| 6,308,276 | B1 | 10/2001 | Ashdown et al. |
| 6,347,374 | B1 | 2/2002 | Drake et al. |
| 6,498,843 | B1 | 12/2002 | Cox |
| 6,789,203 | B1 | 9/2004 | Belissent |
| 6,819,932 | B2 | 11/2004 | Allison et al. |
| 6,990,347 | B2 | 1/2006 | McCann |
| 7,043,000 | B2 | 5/2006 | Delaney et al. |
| 7,092,505 | B2 | 8/2006 | Allison et al. |
| 7,237,267 | B2 | 6/2007 | Rayes et al. |
| 7,246,376 | B2 | 7/2007 | Moharram |
| 7,401,360 | B2 | 7/2008 | Ravishankar et al. |
| 7,403,537 | B2 | 7/2008 | Allison et al. |
| 7,801,124 | B2 | 9/2010 | Drum et al. |
| 10,202,600 | B2 | 2/2019 | Gao et al. |
| 2001/0046856 | A1* | 11/2001 | McCann ............ H04Q 3/0045 455/423 |
| 2002/0133586 | A1 | 9/2002 | Shanklin et al. |
| 2003/0135759 | A1 | 7/2003 | Kim et al. |
| 2003/0177389 | A1 | 9/2003 | Albert et al. |
| 2003/0221123 | A1 | 11/2003 | Beavers |
| 2004/0059910 | A1* | 3/2004 | Allison ............... H04Q 3/0025 713/154 |
| 2004/0081206 | A1* | 4/2004 | Allison ............... H04Q 3/0025 370/522 |
| 2004/0093512 | A1 | 5/2004 | Sample |
| 2004/0093513 | A1 | 5/2004 | Cantrell et al. |
| 2004/0107362 | A1* | 6/2004 | Ravishankar ......... H04L 63/102 726/1 |
| 2004/0111643 | A1 | 6/2004 | Farmer |
| 2006/0095970 | A1 | 5/2006 | Rajagopal et al. |
| 2007/0220256 | A1 | 9/2007 | Yasui et al. |
| 2014/0269679 | A1* | 9/2014 | Gillis .................. H04M 15/49 370/352 |

OTHER PUBLICATIONS

"Database Administraction Manual—Global Title Translation," Tekelec Eagle 5, Release 43.0, 910-6012-001, Revision A, pp. 1-892 (Mar. 2011).

Notification of Transmittal of the International Search Report and the Written Opinion of the International Searching Authority, or the Declaration for International Patent Application No. PCT/US2019/028811 (dated Jul. 11, 2019).

Notice of Allowance and Fee(s) Due for U.S. Appl. No. 10/308,316 (dated Apr. 14, 2008).

Non-Final Office Action for U.S. Appl. No. 10/308,316 (dated Oct. 31, 2007).

Advisory Action for U.S. Appl. No. 10/308,316 (dated May 25, 2007).

Final Office Action for U.S. Appl. No. 10/308,316 (dated Jan. 23, 2007).

Non-Final Office Action for U.S. Appl. No. 10/308,316 (dated May 8, 2006).

"Automatic Call Gapping (Stage 1)," 3GPP2 S.R0016, Version 2.0, pp. 1-8 (Dec. 8, 2000).

* cited by examiner

| FILTER RULES FOR OPCODE #1 (ATI) ||
|---|---|
| FILTER PARAM | FILTER ACTION |
| OPC = THIS NW | ALLOW |
| OPC = EXTERNAL NW | BLOCK |

METHODS, SYSTEMS, AND COMPUTER READABLE MEDIA FOR MULTIPLE TRANSACTION CAPABILITIES APPLICATION PART (TCAP) OPERATION CODE (OPCODE) SCREENING

TECHNICAL FIELD

The subject matter described herein relates to SS7 network security. More particularly, the subject matter described herein relates to screening signaling system number 7 (SS7) messages having multiple TCAP opcodes.

BACKGROUND

Security in SS7 signaling networks is important because SS7 network nodes store subscriber information that should be shielded from attackers and also because SS7 signaling networks still control the establishment of calls and the transport of short message service (SMS) messages between devices. For example, home location registers (HLRs) store subscriber location information and subscriber account information that can be exploited by attackers if the attackers are able to access the information stored in HLRs. In addition, denial of service and other types of attacks can prevent the establishment of communications in SS7 networks if unauthorized signaling messages are allowed into the networks.

In order to address these and other network security threats, security has been provided in SS7 signaling networks using SS7 firewalls that filter SS7 messages based on configurable firewall parameters. For example, an SS7 firewall located at the edge of a service provider's network may block certain types of messages from external networks.

One type of message that may be blocked from an external network is an anytime interrogation (ATI) message. Configuring an SS7 firewall to block ATI and other types of messages from external networks is relatively simple when a given SS7 message only carries one operation code or opcode. An operation code is value carried in a TCAP message that instructs an application as to how to carry out a component action in the TCAP message. TCAP messages are typically destined for databases or end office switches. For example, one common a use for a TCAP message is 800 number translation. Other examples of uses for TCAP messages are local number portability (LNP) translations line information database (LIDB) transactions, and mobile application part (MAP) transactions. In TCAP messages, the operation code is 2 octet field divided into the operation family and the operation specifier. The operation family is 7-bit field (bits A-G) and identifies the group or category related to the operation. Bit H indicates whether a response is expected. The second octet of the operation code consists of the operation specifier, which is used to identify the operation being requested. The specifier is the specific instruction being asked of the application. Table 1 shown below illustrates exemplary operation families.

TABLE 1

| TCAP Operation Families | | | | | | | |
|---|---|---|---|---|---|---|---|
| Operation Families | G | F | E | D | C | B | A |
| Parameter | 0 | 0 | 0 | 0 | 0 | 0 | 1 |
| Charging | 0 | 0 | 0 | 0 | 0 | 1 | 0 |
| Provide Instructions | 0 | 0 | 0 | 0 | 0 | 1 | 1 |

TABLE 1-continued

| TCAP Operation Families | | | | | | | |
|---|---|---|---|---|---|---|---|
| Operation Families | G | F | E | D | C | B | A |
| Connection Control | 0 | 0 | 0 | 0 | 1 | 0 | 0 |
| Caller Interactions | 0 | 0 | 0 | 0 | 1 | 0 | 1 |
| Send Notifications | 0 | 0 | 0 | 0 | 1 | 1 | 0 |
| Network Management | 0 | 0 | 0 | 0 | 1 | 1 | 1 |
| Procedural | 0 | 0 | 0 | 1 | 0 | 0 | 0 |
| Operation Control | 0 | 0 | 0 | 1 | 0 | 0 | 1 |
| Report Event | 0 | 0 | 0 | 1 | 0 | 1 | 0 |
| Miscellaneous | 1 | 1 | 1 | 1 | 1 | 1 | 0 |

The operation family does not provide enough information for the application to process the operation. The operation family only serves as a category for the operation code. Operation specifiers are values that may not be unique across operation families. The operation family in combination with the operation specifier is used to instruct the application as to what operation to perform. Table 2 shown below illustrates example operation specifiers that may be used for the Caller Interactions operation family from Table 1.

TABLE 2

| Operation Specifiers for Caller Interaction Operation Family | | | | | | | | |
|---|---|---|---|---|---|---|---|---|
| Caller Interaction | H | G | F | E | D | C | B | A |
| Play Announcement | 0 | 0 | 0 | 0 | 0 | 0 | 0 | 1 |
| Play Announcement and Collect Digits | 0 | 0 | 0 | 0 | 0 | 0 | 1 | 0 |
| Indicate Information Waiting | 0 | 0 | 0 | 0 | 0 | 0 | 1 | 1 |
| Indicate Information Provided | 0 | 0 | 0 | 0 | 0 | 1 | 0 | 0 |

Thus, if the operation family is 000101 for Caller Interactions and the operation code is 00000001 for Play Announcement, the operation code instructs the application to play an announcement.

As stated above, as SS7 firewall can be configured to screen messages based on an operation code. Some messages may contain a single operation code. However, it is permissible in SS7 networks to aggregate opcodes within a single SS7 message. If an SS7 firewall only inspects a single TCAP opcode, an attacker can hide a disallowed opcode in an SS7 message that also includes an allowed opcode. Such a message may be passed by an SS7 firewall that only expects a single application part per message.

In other examples, an SS7 message may include multiple opcodes and the message may be a legitimate or allowed message for a particular SS7 network. It is desirable to path messages with multiple opcodes where the opcodes have legitimate purposes and are not associated with network attacks.

In light of these difficulties, there exists a need for improved methods, systems, and computer readable media for multiple TCAP opcode screening.

SUMMARY

The subject matter described herein includes methods, systems, and computer readable media for multiple TCAP opcode screening. One method for multiple transaction capabilities application part (TCAP) operation code (opcode) screening includes receiving a first SS7 signaling message including multiple TCAP opcodes. The method further includes determining that the first SS7 signaling message requires further processing. The method further includes, in response to determining that the first SS7 signaling message requires further processing, decoding, from the first SS7 signaling message, N TCAP opcodes, where N is an integer of at least two. The method further includes, for each of the N TCAP opcodes, applying a filter and determining that one of the filters indicates that the opcode, alone or in combination with other parameters in the first SS7 signaling message, is not allowed. The method further includes, in response to determining that the filter indicates that the opcode, alone or in combination with the other parameters is not allowed, performing an SS7 firewall action.

The subject matter described herein for multiple TCAP opcode screening may be used to screen any opcode carried in the TCAP portion of an SS7 message. Examples of such opcodes include mobile application part (MAP) opcodes and other opcodes that may be specified in standards and/or defined by network operators. The TCAP opcodes may be screened in combination with SS7 message parameters, such as originating point code (OPC), called party address, etc. and/or non-SS7 message parameters, such as source Internet protocol (IP) address.

According to one aspect of the subject matter described herein, the receiving, determining, decoding, applying, and performing are performed at an SS7 signal transfer (STP).

According to another aspect of the subject matter described herein, determining that the first SS7 signaling message requires further processing includes determining that the first SS7 signaling message requires global title translation (GTT) processing.

According to another aspect of the subject matter described herein, a method for multiple TCAP opcode screening includes providing a GTT set including a plurality of filters indexed by different TCAP opcodes and wherein applying the filters includes performing lookups in the GTT set for each of the N TCAP opcodes decoded from the first SS7 signaling message.

According to another aspect of the subject matter described herein applying the filters includes determining, for each of the N opcodes, whether the filter implemented in the GTT set for the opcode indicates that the opcode should be allowed or blocked.

According to another aspect of the subject matter described herein, the first SS7 signaling message includes a first TCAP opcode that is indicated as allowed based on the applying of the filter to the first TCAP opcode and a second TCAP opcode that is indicated as blocked based on the applying of the filters to the second TCAP opcode.

According to another aspect of the subject matter described herein, a method for multiple TCAP opcode screening includes receiving a second SS7 signaling message including a plurality of TCAP opcodes, determining that the second SS7 signaling message requires further processing, decoding N opcodes from the second SS7 signaling message, applying a filter to each of the N TCAP opcodes decoded from the second SS7 signaling message, determining that all of the TCAP opcodes in the second SS7 signaling message should be allowed, and routing the second SS7 signaling message to a destination.

According to another aspect of the subject matter described herein routing the second SS7 signaling message to a destination includes selecting a destination point code (DPC) for the second SS7 signaling message based on one of the opcodes in the second SS7 signaling message, inserting the DPC in the second SS7 signaling message and routing the second SS7 signaling message based on the DPC.

According to another aspect of the subject matter described herein, selecting the DPC includes for the second SS7 signaling message includes assigning priorities to the opcodes in the second SS7 signaling message and selecting the DPC corresponding to the opcode in the second SS7 signaling message having the highest assigned priority.

According to another aspect of the subject matter described herein, wherein performing an SS7 firewall action includes at least one of: copying the message to a monitoring platform, generating a call detail record (CDR), incrementing a peg counter and generating an alarm.

A system for TCAP opcode screening includes an SS7 signal transfer point (STP) including a plurality of message processors. The plurality of message processors include a first message processor for receiving a first SS7 signaling message including multiple TCAP opcodes and determining that the first SS7 signaling message requires further processing. The plurality of message processors further include a second message processor for, in response to a determination that the first SS7 signaling message requires further processing, decoding, from the first SS7 signaling message, N TCAP opcodes, where N is an integer of at least two, for each of the N TCAP opcodes, applying a filter and determining that one of the filters indicates that the opcode, alone or in combination with other parameters in the first SS7 signaling message is not allowed, and in response to determining that the filter indicates that the opcode, alone or in combination with the other parameters is not allowed, performing an SS7 firewall action.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
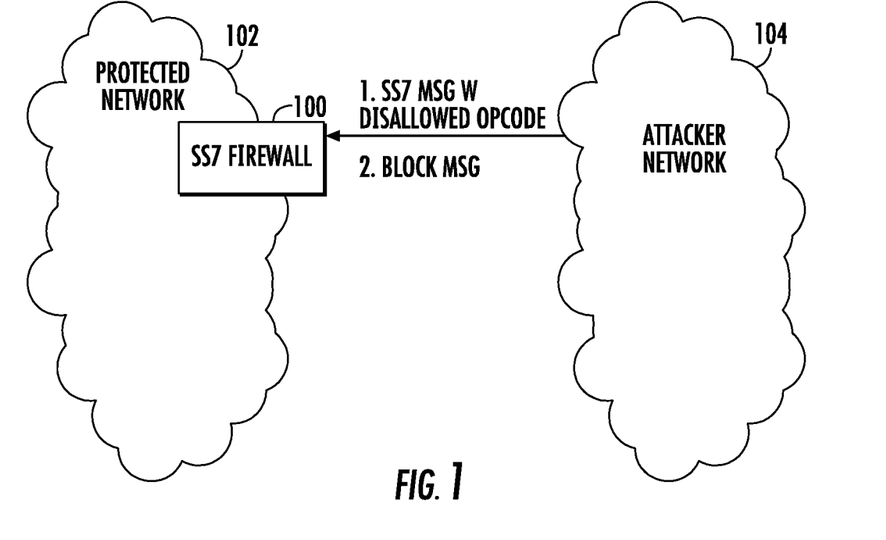
FIG. 1 is a network diagram illustrating firewall filtering in an SS7 network based on a single TCAP opcode.

The subject matter described herein includes methods, systems, and computer readable media for multiple TCAP opcode screening. FIG. 1 is a network diagram illustrating single TCAP opcode screening performed by SS7 firewalls. Referring to FIG. 1, an SS7 firewall 100 may reside at the edge of a protected network 102. SS7 firewall 100 may screen SS7 signaling messages entering protected network 102 based on SS7 message parameters. One parameter that an SS7 firewall may use to screen messages is the TCAP opcode. The TCAP opcode is a parameter carried in an SS7 message that specifies a type of operation to be performed by an application that receive and processes the SS7 signaling message. Opcodes are also used to pass information between network nodes. Values of opcodes may vary between networks. However, some networks may not allow certain types of opcodes from other networks and thus SS7 firewall 100 may be provisioned to block certain opcodes.

In the example illustrated in FIG. 1, SS7 firewall 100 receives an SS7 signaling message from an external network 104, which is labeled "attacker network". The SS7 signaling message includes a disallowed opcode or an opcode that is not allowed from external networks. Accordingly, SS7 firewall 100 decodes the message, determines that the opcode is not allowed, and blocks the message.

SS7 firewall 100 illustrated in FIG. 1 protects network 102 if messages only include a single opcode. However, in order to conserve network bandwidth, some operators package multiple TCAP opcodes in a single signaling connection control part (SCCP) message. SCCP messages are used in SS7 networks to carry TCAP messages and also to allow global title addressing (explained below). Aggregating multiple opcodes in one SCCP message is a valid way to transfer multiple TCAP opcodes between networks. However, an attacker can use TCAP opcode aggregation to hide opcodes for operations that would not be allowed behind opcodes for allowed operations.

Figure 2:
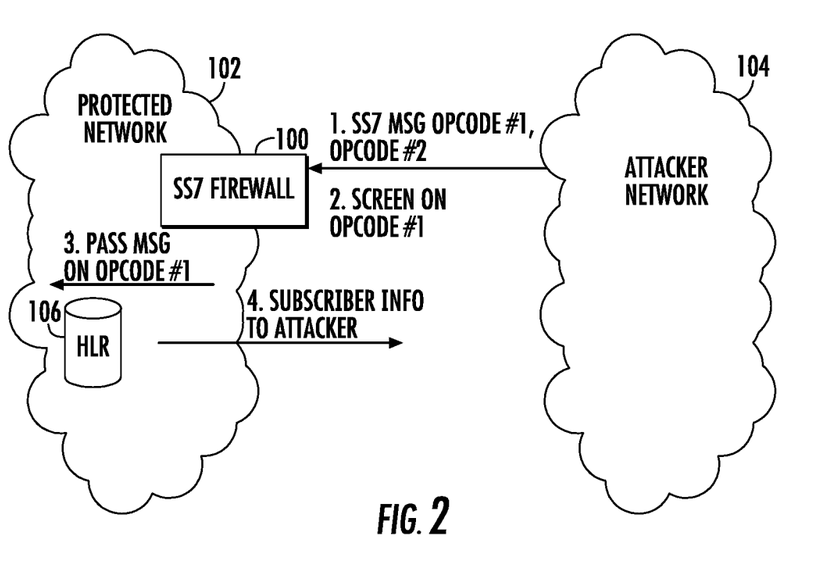
FIG. 2 is a network diagram illustrating firewall filtering in an SS7 signaling network where the SS7 signaling network allows multiple opcodes in a single message but the filtering is only performed for a single opcode.

FIG. 2 illustrates such a scenario. In FIG. 2, SS7 firewall 100 is located at the edge of protected network 102 as illustrated in FIG. 1. In the message flow example, an attacker residing in network 104 sends an SS7 message to network 102. The SS7 message is an SCCP message with multiple TCAP opcodes. In the illustrated example, the opcodes are opcode #1 and opcode #2. SS7 firewall 100 receives the SS7 message and performs screening based on opcode #1. In this example it is assumed that opcode #1 is allowed. Accordingly, SS7 firewall 100 passes the message into protected network 102 based on opcode #1.

However, in this example, opcode #2 is an opcode that would not be allowed. Because opcode #2 is not the first opcode in the message and screening was not performed based on opcode #2, the disallowed message is allowed into the protected network 102. In one example, the disallowed message may be an ATI message. An ATI message is a MAP message sent to an HLR requesting location information for a subscriber. In the illustrated example, the ATI message may be passed to HLR 106. The ATI message may specify the international mobile subscriber identifier (IMSI) of the subscriber. HLR 106 responds to the ATI message with subscriber location information. This information may be provided to the attacker who learns of the subscriber's location.

Figure 3:
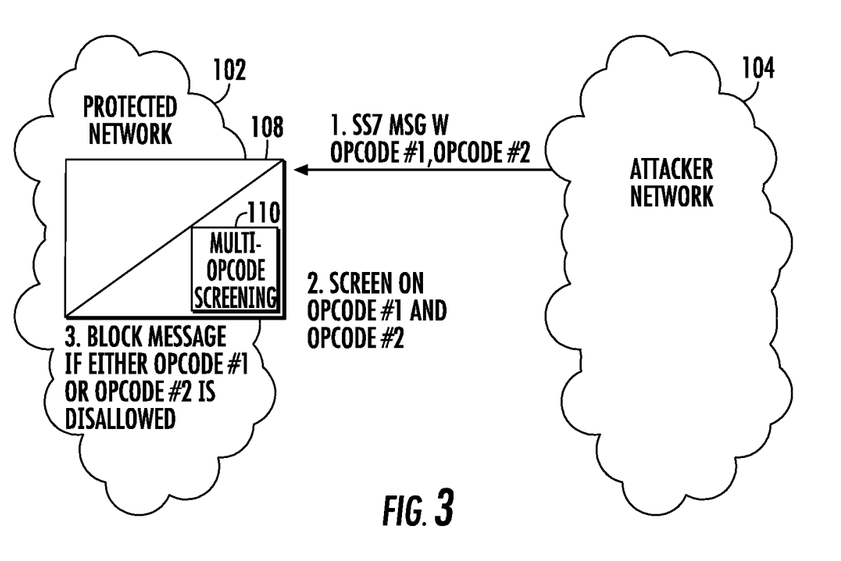
FIG. 3 is a network diagram illustrating an SS7 signaling network that performs multiple TCAP opcode screening.

In order to guard against attacks, such as that illustrated in FIG. 2, a signal transfer point may be configured with multiple TCAP opcode screening to screen multiple TCAP opcodes in a message. A signal transfer point is an SS7 network node that routes SS7 messages based on SS7 point codes. Signal transfer points may also perform global title translation, which translates MTP, SCCP and/or TCAP level parameters into destination point codes. FIG. 3 illustrates an example where an SS7 signal transfer point is configured with multiple TCAP opcode screening. Referring to FIG. 3, signal transfer point 108 includes a multi-opcode screening module 110. STP 108 may be located at the edge of protected network 102 to receive traffic from external networks. In the illustrated example, STP 108 receives an SS7 message with two opcodes, opcode #1 and opcode #2. STP 108 identifies the message as TCAP message and determines that the message carries multiple opcodes. Accordingly, STP 108 performs multiple TCAP opcode screening using multi-opcode screening module 110. In the illustrated example the screening is performed based on opcode #1 and opcode #2. In one configuration example, the message may be blocked if either opcode #1 or opcode #2 is disallowed.

In general, multi-opcode screening module 110 can be configured to screen SS7 signaling messages based N opcodes, where N is an integer of at least 2. A message may be blocked if any of the N opcodes is disallowed in combination with one or more other parameters in a message, such as parameters that identify the originating network.

Figure 4:
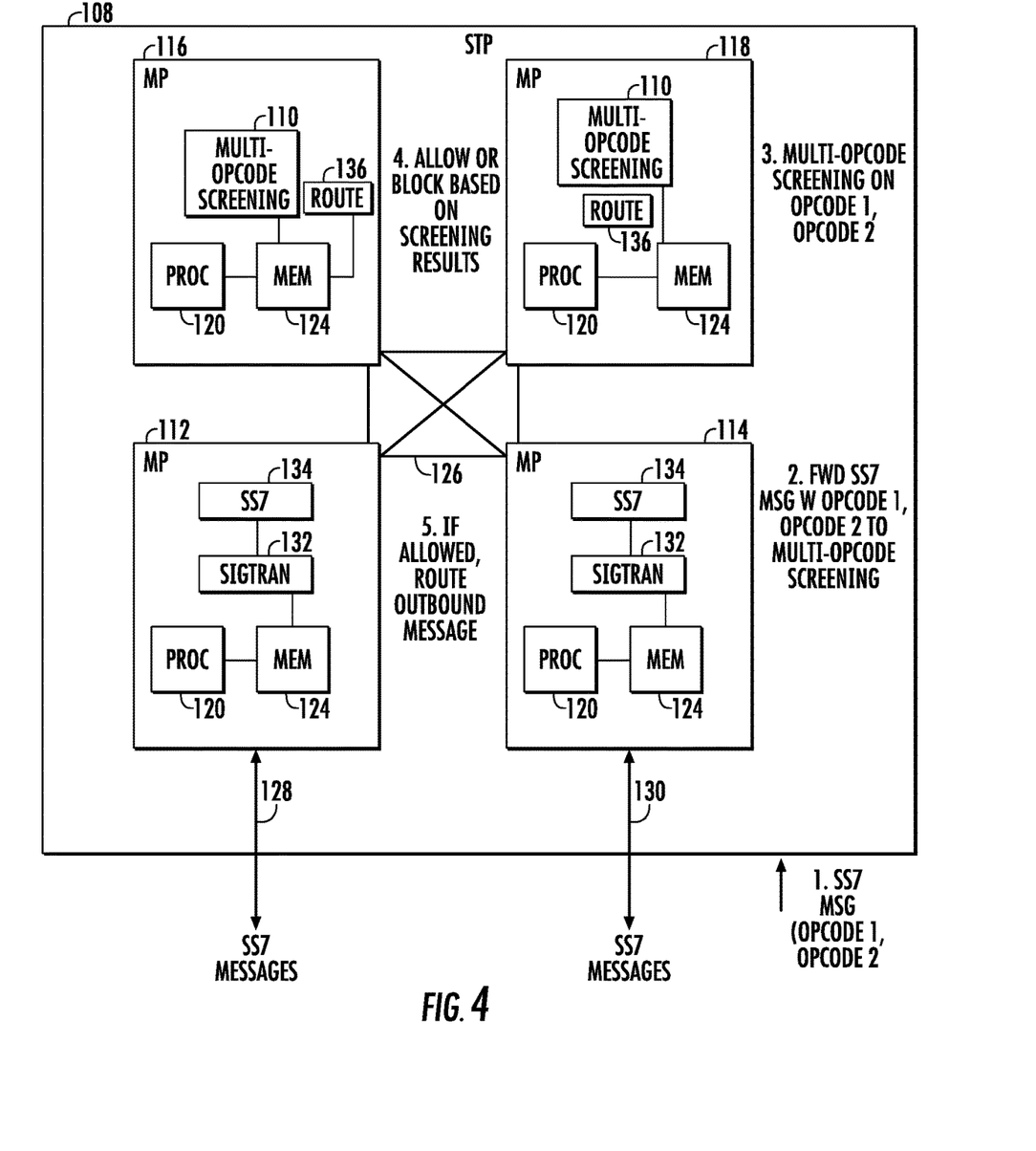
FIG. 4 is a block diagram of STP that implements multiple TCAP opcode screening.

FIG. 4 is a block diagram illustrating an exemplary internal architecture of STP 108 with multi-opcode screening module 110. Referring to FIG. 4, STP 108 is a computing platform with plural message processors 112, 114, 116, and 118. Each message processor 112, 114, 116, and 118 is a printed circuit board with one or more processors 120 and memory 124. Message processors 112, 114, 116, and 118 may communicate with each other over an internal communications medium 126. Internal communications medium 126 may be an Ethernet network, a bus, or any other suitable communications medium for carrying message between processor cards.

In the illustrated example, message processors 112 and 114 interface with external signaling links 128 and 130. The signaling links 128 and 130 carry SS7 signaling messages to and from STP 108. In the illustrated example, signaling links 128 and 130 may be Internet Engineering Task Force (IETF) SIGTRAN signaling links that carry SS7 signaling messages in internet protocol (IP) datagrams. SIGTRAN is a family of protocols specified by the IETF that defines how SS7 signaling messages can be carried over IP signaling links. In general, one or more layers of an SS7 signaling messages are removed and the remainder of the SS7 signaling message is placed within an IP datagram. The IP datagrams are then sent over the SIGTRAN links. Because signal transfer point 108 interfaces with SIGTRAN links, each of message processors 112 and 114 includes a SIGTRAN layer 132 that implements the SIGTRAN protocols required to transport SS7 signaling messages in IP datagrams. In an alternate example, signaling links 128 and 130 may be SS7 layers 1 and 2 links that carry SS7 messages without encapsulating the SS7 messages in IP datagrams.

Each message processor 112 and 114 also includes an SS7 routing and service selection layer 134 identifies SS7 signaling messages that require additional processing by STP 108 and forwards the signaling messages to a message processor within STP 108 to perform such internal processing. For messages that SS7 routing and service selection layer 134 identifies as not requiring further processing by STP 108, SS7 routing and service selection layer 134 routes the messages based on message transfer part (MTP) layer 3 information in the SS7 signaling messages. The determination as to whether a message requires further processing or routing may be performed based on a combination of one or more parameters in the SS7 signaling message, including, but not limited to, the global title indicator, the translation type, the domain, the numbering plan, the nature of address indicator, etc.

The basic function of STP 108 is routing SS7 signaling messages. Accordingly, if message processor 112 or 114 receives an SS7 signaling message that only requires routing, the message may be received by one of message processors 112 or 114, the MTP level 3 destination point code (DPC) may be decoded from the message, used to perform a routing lookup in an SS7 MTP layer 3 route table, and the message may be routed to the message processor associated with the outbound signaling link corresponding to the point code.

For messages that include one or more TCAP opcodes, SS7 routing and service selection layer 134 may identify the messages as requiring further processing and, rather than routing the messages to a message processor with an outbound signaling link, SS7 routing and service selection layer 134 may forward the messages to one of message processors 116 or 118 for further processing. SS7 routing and service selection layer 134 may identify the specific message processor used to process a given SS7 message using any suitable criteria, such as load balancing. Once SS7 routing and service selection layer 134 identifies a message processor for processing a received SS7 message, SS7 routing and service selection layer 134 forwards the message to the message processor over communications medium 126.

Upon receiving a message identified as requiring further processing, multi-opcode screening module 110 decodes the TCAP portion of the message, and, if multiple TCAP opcodes are present, applies multiple TCAP opcode screening. Multiple TCAP opcode screening involves decoding N opcodes from the message, where N is an integer of at least two, determining whether the opcodes indicate that the message should be allowed or disallowed, and performing an SS7 firewall filtering function if the opcode indicates that the message should be disallowed. If the message is allowed, the multi-opcode screening module 110 passes the message to an SS7 routing module 136 that routes the SS7 signaling message to the message processor associated with the outbound signaling link. In one example, multi-opcode screening module 110 may identify the TCAP opcode of the highest priority as configured by the network operator. The TCAP opcode with the highest priority may be used to select a destination point code for the message. The destination point code for the TCAP opcode with the highest priority may be inserted in the message. The destination point code is used by SS7 routing module 136 to route the signaling message to the message processor associated with the outbound signaling link. The message processor associated with the outbound signaling link encapsulates the SS7 signaling message in an IP datagram and forwards the message to the destination over the IP network. If the outbound link is not a SIGTRAN link, the outbound SS7 message may be transmitted over an SS7 MTP layers 1 and 2 link without encapsulating the message in an IP datagram.

In the message flow example illustrated in FIG. 4, an SS7 signaling message is received by message processor 114. The SS7 signaling message includes opcode #1 and opcode #2. The SS7 signaling message is passed to SIGTRAN layer 132, which removes the SIGTRAN and IP layers from the message and forwards the message to SS7 routing and service selection layer 134. SS7 routing and service selection layer 134 identifies the message as requiring further processing and thus forwards the message to one of message processors 116 and 118. In the illustrated example, message processor 118 receives the message. Multi-opcode screening module 110 decodes the TCAP portion of the message, identifies the presence of multiple TCAP opcodes, and performs multi-opcode screening on opcode #1 and opcode #2. If both of the opcodes are allowed, the higher priority opcode is used to select a destination point code for the message, the destination point code is inserted in the message, and the outbound message is routed by routing module 136 to message processor 112. Message processor 112 adds one or more SIGTRAN layers to the message, inserts the SS7 signaling message in an IP datagram and forwards the message to the destination over a network. If the message is not allowed, multi-opcode screening module 110 may block the message and generate one or more records, such as call detail records (CDRs) indicating that the message was dropped. Table 3 shown below illustrates an example of a CDR that may be generated for a message that is blocked based on one or more disallowed TCAP opcodes.

TABLE 3

| CDR for Blocked Multi-Opcode Message | | | | |
| --- | --- | --- | --- | --- |
| OPC | DPC | Opcode #1 | Opcode #2 | Time |
| 1-1-1 | 2-2-2 | Play Announcement | Anytime Interrogation | 6:30 am |

In Table 3, the CDR indicates that a message with multiple opcodes was received at 6:30 am. The first opcode, opcode #1 (the opcode for play announcement) is an allowed opcode and the second opcode (the opcode for anytime interrogation), opcode #2 is a disallowed opcode from an external network. Such records may be used to refine network security rules. For example, if multiple messages from the OPC 1-1-1 result in the messages being blocked for disallowed opcodes, a rule may be installed in STP 108 to block all messages from OPC 1-1-1. In this manner, multi-opcode security screening may be used to formulate new SS7 firewall filtering rules based on message parameters other than opcodes.

Another example of an SS7 network security action may be performed by multi-opcode screening module 110 is to maintain peg counters for messages that are disallowed because of multi-opcode screening. A peg counter is a count of messages having a particular combination of parameters. For example, using the call detail record in Table 3, a peg counter may be started for the SS7 signaling message having the parameter set illustrated in Table 3 that resulted in the message being blocked. If another message is received having the same parameter set, the peg counter may be incremented. Storing peg counters for different types of messages can also be used to refine network security rules. For example, if a peg counter for a combination of opcodes that result in messages being blocked exceeds a threshold value, a new network security rule that blocks messages originating from the source of the messages may be installed.

Figure 5A:
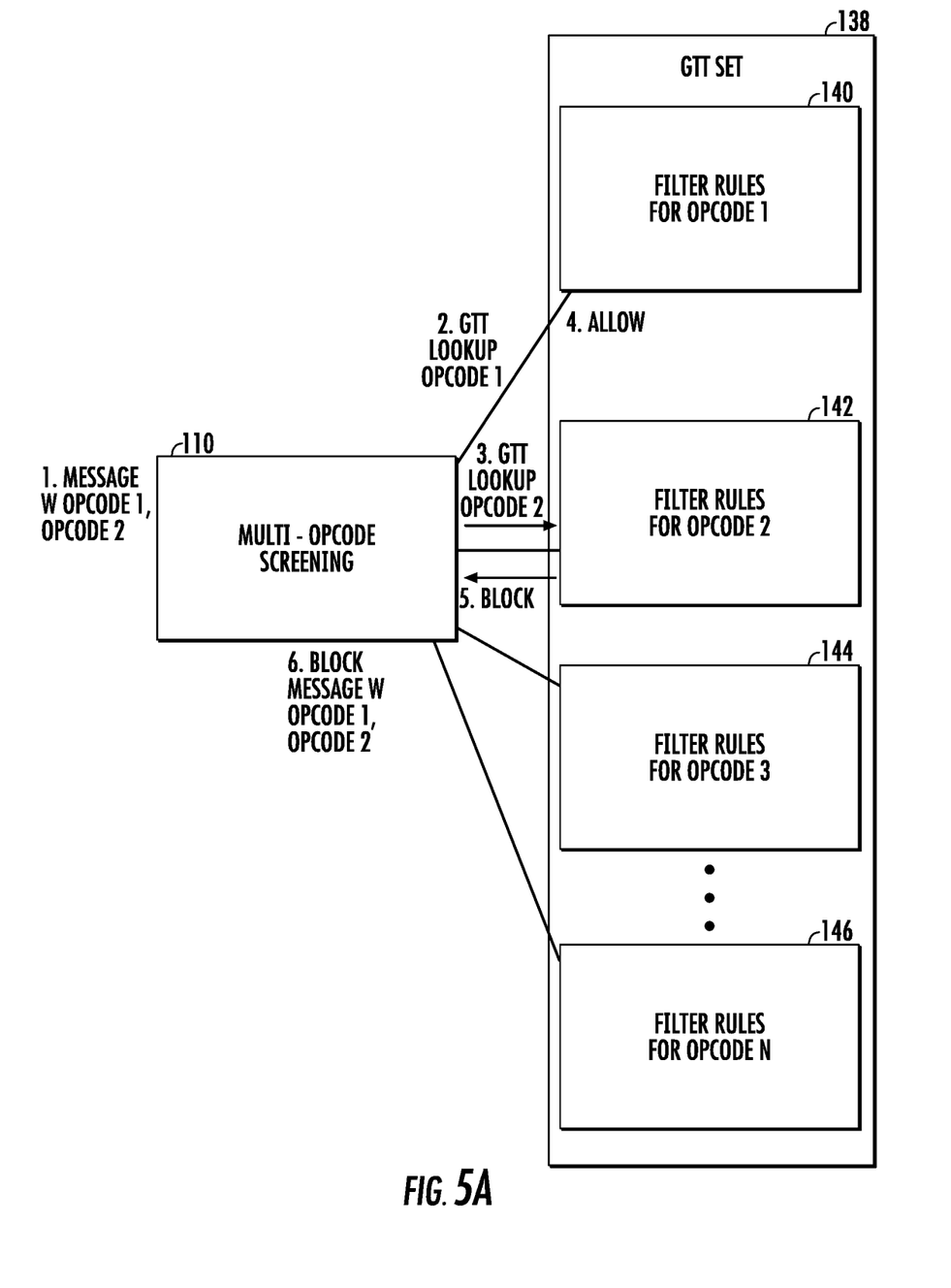
FIG. 5A is a block diagram illustrating the use of a global title transition (GTT) set to implement multiple TCAP opcode screening.

In one exemplary implementation of the subject matter described herein, multi-opcode screening module 110 may utilize a global title translation (GTT) set that stores filter rules for different TCAP opcodes to perform multi-opcode screening. FIG. 5A illustrates this example. In FIG. 5A, multi-opcode screening module 110 may access a GTT set 138. Normally, GTT set 138 stores data for translating MTP, SCCP, and/or TCAP layer parameters into point codes that are inserted into messages before the messages are routed over the network. In the illustrated example, GTT set 138 includes filter rules for different TCAP opcodes. The filter rules include filter rules 140 for opcode #1, filter rules 142 for opcode #2, filter rules 144 for opcode #3, and filter rules 146 for opcode # N.

Figure 5B:
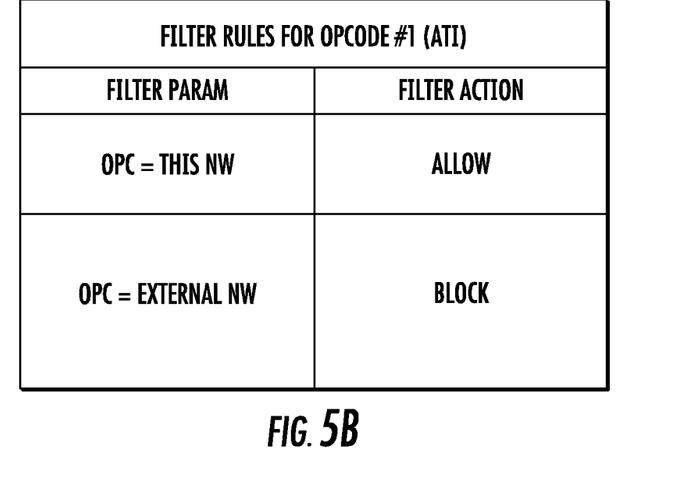
FIG. 5B is a table illustrating a filter rule for a specific TCAP opcode.

When a message with multiple TCAP opcodes is received, multi-opcode screening module 110 performs a GTT lookup for opcode #1 in GTT set 138. The GTT lookup for opcode #1 results in filter rules 140 for opcode #1. FIG. 5B illustrates an example of filter rules for opcode #1. In the illustrated example, it is assumed that opcode #1 is the opcode for anytime interrogation. The filter parameters for opcode #1 include originating point code (OPC). Thus, if the OPC in the message with opcode one is from the same network as the STP, the filter action is allowed. If the OPC is an external network, the filter action is block.

Returning to FIG. 5A, multi-opcode screening module 110 performs a GTT lookup for each opcode present in a received message for up to a configurable number or N opcodes. It may not be possible to screen all opcodes in a message due to the message processing timing requirements. However, the subject matter described herein is not limited to screening any particular number of opcodes. Screening N opcodes, where N is an integer of at least two is intended to be within the scope of the subject matter described herein. In this example, the GTT lookup for opcode #1 resulted in an action of allowed and the GTT lookup for opcode #2 resulted in an action of block. Accordingly, multi-opcode screening module 110 may block message with opcode #1 and opcode #2.

Figure 6:
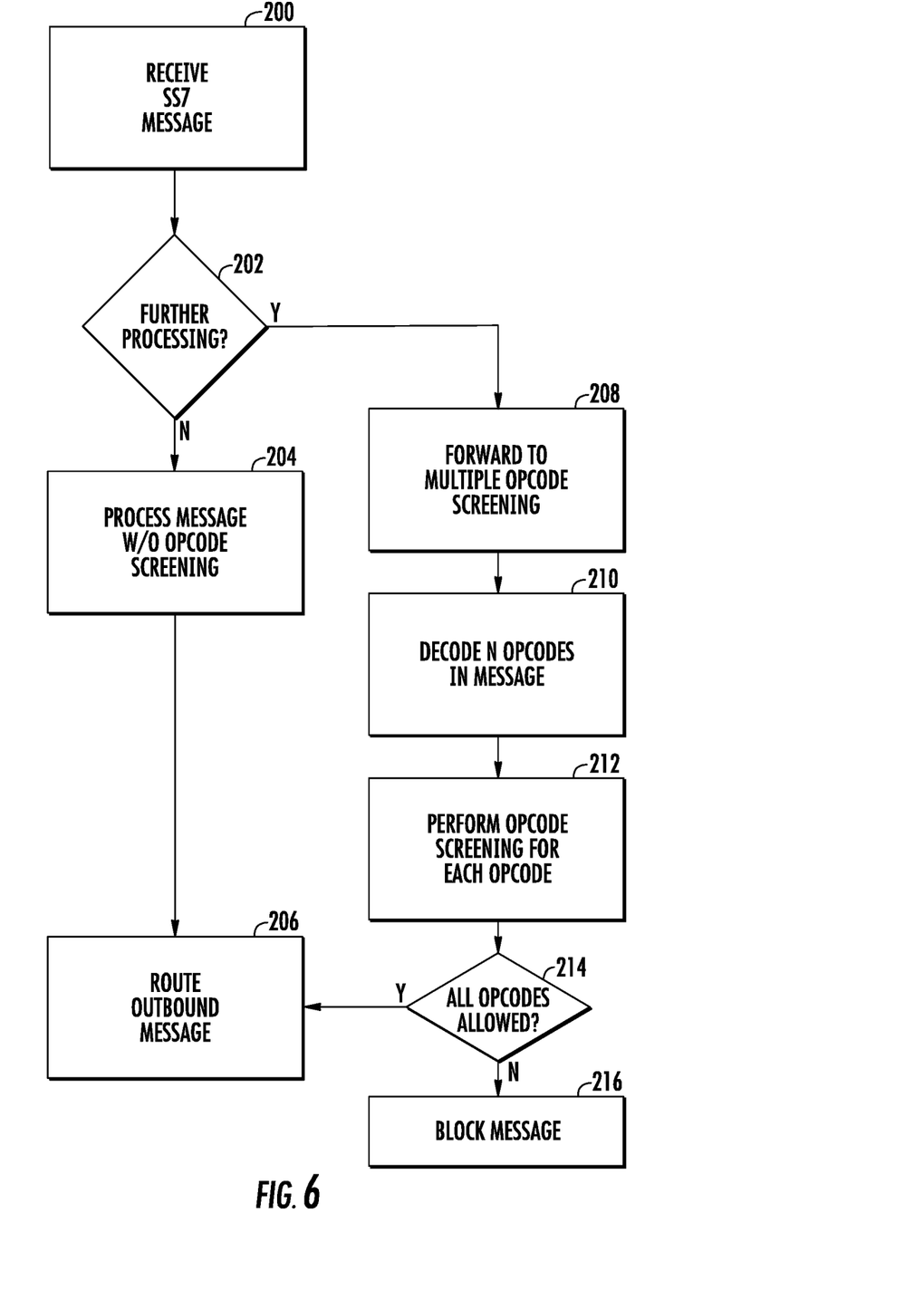
FIG. 6 is a flow chart illustrating an exemplary process for multiple TCAP opcode screening.

FIG. 6 is a flow chart illustrating an exemplary process for multi-opcode screening. Referring to FIG. 6, in step 200, an SS7 signaling message is received. For example, the SS7 signaling message may be received at a message processor 112 or 114 within an STP. In step 202 it is determined whether the SS7 signaling message requires further processing by STP 108. Identifying whether an SS7 signaling message requires further processing may be performed by SS7 service selection and routing module 134. Determining whether a message requires further processing by STP 108 may be performed by examining one or more SCCP parameters in the SS7 signaling message. As stated above, these parameters may include the global title indicator, routing indicator, domain, translation type, numbering plan, nature of address indicator, or any combination of such parameters. If the message does not require further processing, control proceeds to step 204 where the message is processed without multi-opcode screening. Processing the message without multi-opcode screening may include routing the outbound signaling message as indicated in step 206.

Returning to step 202, if the message is determined to require further processing, control proceeds to step 208 where the message is forwarded to multiple opcode screening. Using the example in FIG. 4, the message may be sent to one of message processors 116 and 118 with multi-opcode screening module 110. In step 210, N opcodes are decoded from the message where N is a configurable number. Decoding N opcodes from the message may include decoding a sufficient portion of the TCAP layer of the message to identify each opcode and any additional parameters required to screen the opcodes. The following is an example of a TCAP message in hexadecimal and the corresponding decoded parameters.

62 74 48 04 00 02 00 30 6B 1A28 18 06 07 00 11 86 05 01
01 01 A0 0D 60 0B A1 09 06 07 04 00 00 01 00 19 02 6C
50 A1 4E02 01 01 02 01 2E 30 46 80 05 70 31 42 44 44 84
06 A1 70 91 92 55 55 04 35 2F 09 00 70 97 92 62 23 04 00
90 20 11 80 01 24 00 27 43 50 7A 0E A2 A3 CB 20 71 794E
07 B1 C3 EE 73 3D 7C 2E 83 D2 20 74 D8 5E 06 95 ED
65 39 68 5E 2E BB 01 00

According to tag length values, the TCAP message can be decoded as follows.

```
--> 62|74 <-- Start of TCAP begin message
    |
    '--> 48|04:00 02 00 30 <-- Transaction ID
    |
    '--> 6B|1A <--Start of Dialog portion
         |
         '--> 28|18
              |
              '--> 06|07:00 11 86 05 01 01 01
              |
              '--> A0|0D
                   |
                   '--> 60|0B
                        |
                        '--> A1|09
                             |
                             '--> 06|07:04 00 00 01 00 19 02 <--
Application context
    |
    '--> 6C|50 <-- Start of component portion
         |
         '--> A1|4E
              |
              '--> 02|01:01 <-- ComponentId invoke id)
              |
              '--> 02|01:2E <-- Operation Code
              |
              '--> 30|46 <-- Start of parameter buffer
                   |
                   '--> 80|05:70 31 42 44 44       <-- SM-RP-DA(BCD)
                   |
                   '--> 84|06:A1 70 91 92 55 55   <-- SM-RP-OA(BCD)
                   |
                   '--> 04|35:2F 09 00 70 97 92 62 23 04 00 90 20 11 80
01 24 00 27 43 50 7A 0E A2 A3 CB 20 71 79 4E 07 B1 C3 EE 73 3D
7C
2E 83 D2 20 74 D8 5E 06 95 ED 65 39 68 5E 2E BB 01 <-- SM-RP-UI
```

It can be seen from the above-decoded message that the opcode 012E, indicated in bold, in the undecoded message is a two octet value that is the $45^{th}$ and $46^{th}$ octets in the TCAP message. The second octet of the TCAP opcode, 0x2E or 46 in decimal, identifies the message as a MAP mobile originated forward short message (MO_FSM) message. A MAP MO_FSM message is sent from the mobile switching center (MSC) serving a mobile subscriber to a short message service center (SMSC) and carries an SMS message to be sent to a destination subscriber. The remaining decoded parameters in the TCAP message include SMS originating and destination address parameters (SM-RP-OA and SM-RP-DA), the short message data being transmitted (SM-RP-UI). In addition to decoding the TCAP opcode, multi-opcode screening module 110 may decode any one or more of these parameters and also MTP and SCCP layer parameters such as OPC and calling party address, to be used in performing screening based on each TCAP opcode.

The example TCAP message above includes a single TCAP opcode. However, as indicated above, multi-opcode screening module 110 may screen up to N opcodes in a message, where N is a configurable parameter set by the network operator. The following is an example of output that may be generated by multi-opcode screening module 110 for an SS7 message that includes two opcodes—one for MAP update location and one for ActivateSS. The message decode example includes decoded parameters from MTP level 2 through TCAP and MAP layers.

```
Protocol: MTP2
Message Length: 154
*** Start of MTP Level 2(MTP2) ***
***Start of MTP(MTP) ***
                MSU
0003    10010011 93
            ----0011        Service Indicator                       0011 - SCCP
            --01----        Network Priority                        01 - priority 1
            10------        Network Indicator                       10 - National
                                                                    Network
0004    00001010 0a         Destination Point Code                  10-10-10
0005    00001010 0a
0006    00001010 0a
0007    00010100 14         Origination Point Code                  20-20-20
0008    00010100 14
0009    00010100 14
0010    00000000 00         Signaling Link Selection                0
*** Start of SCCP(SCCP) ***
                Unitdata
0011    00001001 09         Message Type                            09
0012    10000000 80
            ----0000        Protocol Class                          Class 0
            1000----        Message Handling                        1000-return
                                                                    message on
                                                                    error
                Variable Portion
0013    00000011 03         Called Party Address                    Offset 0016
0014    00001110 0e         Calling Party Address                   Offset 0028
0015    00011001 19         Data Portion Pointer                    Offset 0040
0016    00001011 0b         Called Party Address Length             11
0017    10001011 8b
            -------1        Subsystem Number Indicator              Included
            ------1-        Point Code Indicator                    Included
            --0010--        Global Title indicator                  0010 - Global
                                                                    title w/
                                                                    translation
                                                                    type
            -0------        Routing indicator                       0 - route by
                                                                    global title
            1-------        Reserved for International/National use 1 - Reserved
                                                                    for
                                                                    National use
0018    00000110 06         Subsystem Number                        6
0019    00011110 1e         Signaling Point Code                    30-30-30
0020    00011110 1e
0021    00011110 1e
0022    00001111 0f         Translation Type                        15
0023    10001000 88         Address information                     8888888888
0024    10001000 88
0025    10001000 88
0026    10001000 88
0027    10001000 88
0028    00001011 0b         Calling Party Address Length            11
0029    10001011 8b
            -------1        Subsystem Number Indicator              Included
            ------1-        Point Code Indicator                    Included
            --0010--        Global Title indicator                  0010 - Global
                                                                    title w/
                                                                    translation
                                                                    type
            -0------        Routing indicator                       0 - route by
                                                                    global title
            1-------        Reserved for International/National use 1 - Reserved
                                                                    for
                                                                    National use
0030    00000110 06         Subsystem Number                        6
0031    00010100 14         Signaling Point Code                    20-20-20
0032    00010100 14
0033    00010100 14
0034    00001010 0a         Translation Type                        10
0035    01110111 77         Address information                     7777777777
0036    01110111 77
0037    01110111 77
0038    01110111 77
```

-continued

| | | | |
|---|---|---|---|
| 0039 | 01110111 77 | | |
| | | Data Portion | |
| *** Start of GSM Mobile Application Part Phase2+(GMAP *** | | | |
| | | TCAP Layer | |
| 0040 | 01110001 71 | TCAP Length | 113 |
| 0041 | 01100010 62 | Begin Message | 98 |
| 0042 | 01101111 6f | Message Length | 111 |
| | | Transaction Portion | |
| 0043 | 01001000 48 | Originating TX ID | 72 |
| 0044 | 00000100 04 | Transaction ID Length | 4 |
| 0045 | 00000000 00 | Originating Transaction ID | 00 00 00 00 |
| 0046 | 00000000 00 | | |
| 0047 | 00000000 00 | | |
| 0048 | 00000000 00 | | |
| | | Optional Dialogue Portion | |
| | | Dialogue Portion | |
| 0049 | 01101011 6b | Dialogue Portion Tag | 107 |
| 0050 | 00110111 37 | Length | 55 |
| 0051 | 00101000 28 | External Tag | 40 |
| 0052 | 00110101 35 | Length | 53 |
| 0053 | 00000110 06 | Object Identifier Tag | 06 |
| 0054 | 00000111 07 | Length | 07 |
| 0055 | 00000000 00 | CCITT Q Recommendation | 4352 |
| 0056 | 00010001 11 | | |
| 0057 | 10000110 86 | Document X305 | 1414 |
| 0058 | 00000101 05 | | |
| 0059 | 00000001 01 | Dialogue As PDU | 257 |
| 0060 | 00000001 01 | | |
| 0061 | 00000001 01 | Version1 | 01 |
| 0062 | 10100000 a0 | ASN1-Type Tag | 160 |
| 0063 | 00101010 2a | Length | 42 |
| 0064 | 01100000 60 | Dialogue PDU Selection | Dialogue Request Tag |
| 0065 | 00101000 28 | Request Length | 40 |
| | | Dialog Request Optional | |
| | | Protocol Version | |
| 0066 | 10000000 80 | Protocol Version Tag | 128 |
| 0067 | 00000010 02 | Length | 2 |
| 0068 | 00000000 00 | Protocol Version | 0 |
| 0069 | 00000000 00 | - | |
| 0070 | 10100001 a1 | Application Context name Tag | 161 |
| 0071 | 00001001 09 | AC Length | 9 |
| 0072 | 00000110 06 | Object Identifier | 6 |
| 0073 | 00000111 07 | Length | 7 |
| 0074 | 00000100 04 | Protocol | 00000100 - CCITT Identified Organization |
| 0075 | 00000000 00 | Sub Protocol | 00000000 - etsi |
| 0076 | 00000000 00 | Domain | 00000000 - mobile domain |
| 0077 | 00000001 01 | Network | 00000001 - gsmNetwork |
| 0078 | 00000000 00 | Application Context ID | 0 |
| 0079 | 00000001 01 | Application Context | 00000001 - map-netwtorkLocUp ac |
| 0080 | 00000011 03 | Version | 3 |
| | | AARQ Optional | |
| | | Optional User Information | |
| 0081 | 10111110 be | User Information Tag | 190 |
| 0082 | 00010111 17 | Information Length | 23 |
| 0083 | 00101000 28 | External Tag | 40 |
| 0084 | 00010101 15 | Length | 21 |
| 0085 | 00000110 06 | Object Identifier Tag | 6 |
| 0086 | 00000111 07 | Length | 7 |
| 0087 | 00000000 00 | Object Data | 00 00 00 00 |
| 0088 | 00000000 00 | | |
| 0089 | 00000000 00 | | |
| 0090 | 00000000 00 | | |
| 0091 | 00000000 00 | | |
| 0092 | 00000000 00 | | |
| 0093 | 00000000 00 | | |
| 0094 | 10100000 a0 | ANY Tag | 160 |

-continued

| | | | |
|---|---|---|---|
| 0095 | 00001010 0a | Length | 10 |
| 0096 | 10100000 a0 | MAP-Operation Choice | map-open |
| 0097 | 00001000 08 | Length | 8 |
| | | Optional Part for map-open destinationRef | |
| 0098 | 10000000 80 | destinationRefernce Tag | 128 |
| 0099 | 00000110 06 | Length | 6 |
| | | destinationRef Value Adress String | |
| 0100 | 10010101 95 | | |
| | ----0101 | numbering plan indicator | 0101 - reserved |
| | -001---- | nature of address indicator | 001 - international number |
| | 1------- | Extension | 01 |
| 0101 | 00010001 11 | Address String | 1111111111 |
| 0102 | 00010001 11 | | |
| 0103 | 00010001 11 | | |
| 0104 | 00010001 11 | | |
| 0105 | 00010001 11 | | |
| | | - Optional Component Portion Component Portion | |
| 0106 | 01101100 6c | Component Portion Tag | 108 |
| 0107 | 00101110 2e | Component Portion Length Invoke Component | 46 |
| 0108 | 10100001 a1 | Invoke Tag | 161 |
| 0109 | 00011111 1f | Invoke Length Invoke ID | 31 |
| 0110 | 00000010 02 | Invoke ID Tag | 2 |
| 0111 | 00000001 01 | Invoke ID Length | 1 |
| 0112 | 00000000 00 | Invoke ID Optional Linked ID - Operation Code | 0 |
| 0113 | 00000010 02 | Operation Code Tag | Local Operation Code |
| 0114 | 00000001 01 | Operation Code Length | 01 |
| 0115 | 00000010 02 | MAP operation UpdateLocation | |
| 0116 | 00110000 30 | Parameter Sequence Tag | 48 |
| 0117 | 00010111 17 | Parameter Length Mandatory Part IMSI | 23 |
| 0118 | 00000100 04 | IMSI Tag | 4 |
| 0119 | 00000101 05 | Length | 5 |
| 0120 | 00100010 22 | IMSI Digits | 2222222222 |
| 0121 | 00100010 22 | | |
| 0122 | 00100010 22 | | |
| 0123 | 00100010 22 | | |
| 0124 | 00100010 22 | | |
| | | MSC Number | |
| 0125 | 10000001 81 | MSC-Number Tag | 129 |
| 0126 | 00000110 06 | Length AddressString | 6 |
| 0127 | 10010001 91 | | |
| | ----0001 | Numbering Plan | 0001 - ISDN/Telephony Numbering |
| | -001---- | Nature of Address | 001 - international number |
| | 1------- | Ext | 01 |
| 0128 | 01100110 66 | MSC Address Digits | 6666666666 |
| 0129 | 01100110 66 | | |
| 0130 | 01100110 66 | | |
| 0131 | 01100110 66 | | |
| 0132 | 01100110 66 | | |
| | | Additional Addressstring VLR Number | |
| 0133 | 00000100 04 | VLR - Number Tag | 4 |
| 0134 | 00000110 06 | Length AddressString | 6 |
| 0135 | 10010001 91 | | |
| | ----0001 | Numbering Plan | 0001 - |

-continued

| | | | |
|---|---|---|---|
| ISDN/Telephony Numbering | | | |
| -001---- international nunber | | Nature of Address | 001 - |
| | 1------- | Ext | 01 |
| 0136 | 01010101 55 | VLR Address Digits | 5555555555 |
| 0137 | 01010101 55 | | |
| 0138 | 01010101 55 | | |
| 0139 | 01010101 55 | | |
| 0140 | 01010101 55 | | |
| | | Additional AddressString Optional Part Vendor Specific Octets Invoke Component | |
| 0141 | 10100001 a1 | Invoke Tag | 161 |
| 0142 | 00001011 0b | Invoke Length Invoke ID | 11 |
| 0143 | 00000010 02 | Invoke ID Tag | 2 |
| 0144 | 00000001 01 | Invoke ID Length | 1 |
| 0145 | 00000000 00 | Invoke ID Optional Linked ID - Operation Code | 0 |
| 0146 | 00000010 02 | Operation Code Tag | Local |
| Operation Code | | | |
| 0147 | 00000001 01 | Operation Code Length | 01 |
| 0148 | 00001100 0c | MAP Operation | ActivateSS |
| 0149 | 00110000 30 | Parameter Sequence Tag | 48 |
| 0150 | 00000011 03 | Parameter Length Mandatory Part | 3 |
| 0151 | 00000100 04 | SS-Code Tag | 4 |
| 0152 | 00000001 01 | Length | 1 |
| 0153 all | 00000000 00 | SS-Feature Code Value | 00000000 - supplementary services |
| | | Optional Part | |

In the above-listed message decode example, the two opcodes in the message are indicated in bold. The first opcode appears in line 0115 and is the MAP opcode for update location, a transaction that can be used to inform the home network of a new location of a subscriber terminal. Because such a transaction can be used to direct messages and calls to an attacker, update location transactions may not be allowed from non-trusted networks. Accordingly, the update location opcode may be screened in combination with originating network identifying parameters, such as the originating point code (OPC) and calling party address, to determine whether the message should be allowed.

The second opcode in the above-listed message decode example is also indicated in bold and appears in line 0148. The second opcode is for a MAP ActivateSS operation. The Activate SS operation can be used to activate or deactivate supplementary services, such as caller ID service, for a mobile device. Because such an operation can change services available to a subscriber device, the ActivateSS opcode may be screened along with other message parameters, such as originating network parameters, to determine whether the opcode should be allowed or disallowed.

Returning to FIG. 6, in step 212, multi-opcode screening is preformed for each of the N opcodes. Multi-opcode screening may include performing a lookup in GTT set 138 using each opcode in combination with one or more other message parameters to identify a filter rule for the particular combination of parameters and whether the combination of parameters indicates that the message should be allowed or blocked. In step 214 it is determined whether all of the opcodes are allowed. If all of the opcodes are allowed, the outbound message is routed (step 206). Prior to routing the message, the highest priority opcode may be identifies. The highest priority opcode may be used to select the destination point code for the message. The destination point code may be inserted in the message. The destination point code inserted in the message may be used to route the message. If any of the opcodes are not allowed, control proceeds to step 216 where the message is blocked.

Additional network security actions may be performed in addition to blocking the message. As stated above, a call detail record may be generated for messages that are blocked based on TCAP opcodes. A peg counter may also be maintained for such messages. Another network security action that may be performed is that an alarm may be generated to alert the network operator of the disallowed message. Yet another network action that may be performed is copying the signaling message and sending a copy to a monitoring platform.

The subject matter described herein thus improves the technological field of computer and telecommunications network security by blocking certain messages where disallowed opcodes are hidden behind one or more allowed opcodes. Implementing such screening at a signal transfer point is advantageous because a signal transfer point is the node that interconnects other SS7 endpoints and thus is an efficient location multiple opcode screening. Implementing multiple opcode screening using a GTT set within a signal transfer point is advantageous because GTT sets are databases that are configurable by the network operator. Thus, if allowed or disallowed opcodes change, he network operator can update the screening performed by the operator's STP by provisioning the GTT set to adapt to new security threats.

It will be understood that various details of the presently disclosed subject matter may be changed without departing from the scope of the presently disclosed subject matter.

Furthermore, the foregoing description is for the purpose of illustration only, and not for the purpose of limitation.

What is claimed is:

1. A method for multiple transaction capabilities application part (TCAP) operation code (opcode) screening, the method comprising:
   receiving a first signaling system number 7 (SS7) signaling message including multiple TCAP opcodes;
   determining that the first SS7 signaling message requires further processing;
   in response to determining that the first SS7 signaling message requires further processing, decoding, from the first SS7 signaling message, N TCAP opcodes, where N is an integer of at least two;
   for each of the N TCAP opcodes, applying a filter and determining that one of the filters indicates that the opcode, alone or in combination with other parameters in the first SS7 signaling message, is not allowed; and
   in response to determining that the one filter indicates that the opcode alone or in combination with the other parameters is not allowed, performing an SS7 firewall action, wherein the first SS7 signaling message includes a first TCAP opcode that is indicated as allowed based on the applying of a filter to the first TCAP opcode and a second TCAP opcode that is indicated as blocked based on the applying of the one filter to the second TCAP opcode.

2. The method of claim 1, wherein the receiving, determining, decoding, applying, and performing are performed at an SS7 signal transfer (STP).

3. The method of claim 1, wherein determining that the first SS7 signaling message requires further processing includes determining that the first SS7 signaling message requires global title translation (GTT) processing.

4. The method of claim 3, comprising providing a GTT set including a plurality of filters indexed by different TCAP opcodes and wherein applying the filters includes performing lookups in the GTT set for each of the N TCAP opcodes decoded from the first SS7 signaling message.

5. The method of claim 4, wherein applying the filters includes determining, for each of the N opcodes, whether the filter implemented in the GTT set for the opcode indicates that the opcode should be allowed or blocked.

6. The method of claim 1, comprising receiving a second SS7 signaling message including a plurality of TCAP opcodes, determining that the second SS7 signaling message requires further processing, decoding N opcodes from the second SS7 signaling message, applying a filter to each of the N TCAP opcodes decoded from the second SS7 signaling message, determining that all of the TCAP opcodes in the second SS7 signaling message should be allowed, and routing the second SS7 signaling message to a destination.

7. The method of claim 6, wherein routing the second SS7 signaling message to a destination includes selecting a destination point code (DPC) for the second SS7 signaling message based on one of the opcodes in the second SS7 signaling message, inserting the DPC in the second SS7 signaling message and routing the second SS7 signaling message based on the DPC.

8. The method of claim 7, wherein selecting the DPC includes assigning priorities to the opcodes in the second SS7 signaling message and selecting the DPC corresponding the opcode in the second SS7 signaling message having the highest assigned priority.

9. The method of claim 1, wherein performing an SS7 firewall action includes at least one of: copying the message to a monitoring platform, generating a call detail record (CDR), incrementing a peg counter and generating an alarm.

10. A system for multiple transaction capabilities application part (TCAP) operation code (opcode) screening, the system comprising:
   an SS7 signal transfer point (STP) including a plurality of message processors including:
   a first message processor for receiving a first signaling system number 7 (SS7) signaling message including multiple TCAP opcodes and determining that the first SS7 signaling message requires further processing; and
   a second message processor for, in response to a determination that the first SS7 signaling message requires further processing, decoding, from the first SS7 signaling message, N TCAP opcodes, where N is an integer of at least two, for each of the N TCAP opcodes, applying a filter and determining that one of the filters indicates that the opcode, alone or in combination with other parameters in the first SS7 signaling message, is not allowed, and in response to determining that the one filter indicates that the opcode, alone or in combination with the other parameters, is not allowed, performing an SS7 firewall action, wherein the first SS7 signaling message includes a first TCAP opcode that is indicated as allowed based on the applying of a filter to the first TCAP opcode and a second TCAP opcode that is indicated as blocked based on the applying of the one filter to the second TCAP opcode.

11. The system of claim 10, wherein determining that the first SS7 signaling message requires further processing includes determining that the first SS7 signaling message requires global title translation (GTT) processing.

12. The system of claim 11, comprising providing a GTT set in the STP and including a plurality of filters indexed by different TCAP opcodes and wherein applying the filters includes performing lookups in the GTT set for each of the N TCAP opcodes decoded from the first SS7 signaling message.

13. The system of claim 12, wherein applying the filters includes determining, for each of the N opcodes, whether the filter implemented in the GTT set for the opcode indicates that the opcode should be allowed or blocked.

14. The system of claim 10, comprising receiving a second SS7 signaling message including a plurality of TCAP opcodes, determining that the second SS7 signaling message requires further processing, decoding N opcodes from the second SS7 signaling message, applying a filter to each of the N TCAP opcodes decoded from the second SS7 signaling message, determining that all of the TCAP opcodes in the second SS7 signaling message should be allowed, and routing the second SS7 signaling message to a destination.

15. The system of claim 14, wherein routing the second SS7 signaling message to a destination includes selecting a destination point code (DPC) for the second SS7 signaling message based on one of the opcodes in the second SS7 signaling message, inserting the DPC in the second SS7 signaling message and routing the second SS7 signaling message based on the DPC.

16. The system of claim 15, wherein selecting the DPC includes assigning priorities to the opcodes in the second SS7 signaling message and selecting the DPC corresponding the opcode in the second SS7 signaling message having the highest assigned priority.

17. The system of claim 10, wherein performing an SS7 firewall action includes at least one of: copying the message to a monitoring platform, generating a call detail record (CDR), incrementing a peg counter and generating an alarm.

18. A non-transitory computer readable medium having stored thereon executable instructions that when executed by a processor of a computer control the computer to perform steps comprising:

receiving a first signaling system number 7 (SS7) signaling message including multiple transaction capabilities application part (TCAP) operation codes (opcodes);

determining that the first SS7 signaling message requires further processing;

in response to determining that the first SS7 signaling message requires further processing, decoding, from the first SS7 signaling message, N TCAP opcodes, where N is an integer of at least two;

for each of the N TCAP opcodes, applying a filter and determining that one of the filters indicates that the opcode, alone or in combination with other parameters in the first SS7 signaling message, is not allowed; and in response to determining that the one filter indicates that the opcode, alone or in combination with the other parameters is not allowed, performing an SS7 firewall action, wherein the first SS7 signaling message includes a first TCAP opcode that is indicated as allowed based on the applying of a filter to the first TCAP opcode and a second TCAP opcode that is indicated as blocked based on the applying of the one filter to the second TCAP opcode.

\* \* \* \* \*

UNITED STATES PATENT AND TRADEMARK OFFICE
CERTIFICATE OF CORRECTION

PATENT NO.         : 10,862,866 B2
APPLICATION NO.    : 16/019454
DATED              : December 8, 2020
INVENTOR(S)        : Erickson et al.

It is certified that error appears in the above-identified patent and that said Letters Patent is hereby corrected as shown below:

In the Specification

In Columns 13-14, Line 4, delete "(GMAP" and insert -- (GMAP) --, therefor.

In Columns 13-14, Line 62, delete "netwtorkLocUp" and insert -- networkLocUp --, therefor.

In Columns 15-16, Line 10, delete "Adress" and insert -- Address --, therefor.

In Columns 15-16, Line 71, delete "Addressstring" and insert -- AddressString --, therefor.

In Columns 17-18, Line 4, delete "nunber" and insert -- number --, therefor.

In Column 17, Line 67, delete "identifies." and insert -- identified. --, therefor.

In Column 18, Line 62, delete "he" and insert -- the --, therefor.

In the Claims

In Column 20, Line 34, in Claim 12, delete "claim $11_1$" and insert -- claim 11, --, therefor.

Signed and Sealed this
First Day of June, 2021

Drew Hirshfeld
*Performing the Functions and Duties of the
Under Secretary of Commerce for Intellectual Property and
Director of the United States Patent and Trademark Office*